United States Patent
Kawai et al.

(10) Patent No.: US 7,971,388 B2
(45) Date of Patent: Jul. 5, 2011

(54) METHOD FOR CULTIVATING HON-SHIMEJI MUSHROOM ON FUNGAL BED

(75) Inventors: Takashi Kawai, Shiga (JP); Katsuhiko Kusakabe, Shiga (JP); Akihiko Kita, Shiga (JP); Ikunoshin Kato, Shiga (JP)

(73) Assignee: Takara Bio Inc., Shiga (JP)

( * ) Notice: Subject to any disclaimer, the term of this patent is extended or adjusted under 35 U.S.C. 154(b) by 366 days.

(21) Appl. No.: 12/178,830

(22) Filed: Jul. 24, 2008

(65) Prior Publication Data

US 2009/0025286 A1  Jan. 29, 2009

(30) Foreign Application Priority Data

Jul. 24, 2007 (JP) ................................. 2007-192495

(51) Int. Cl.
*A01G 1/04* (2006.01)

(52) U.S. Cl. .......................................................... 47/1.1

(58) Field of Classification Search .................... 47/1.1, 47/1.01 R, 58.1
See application file for complete search history.

(56) References Cited

FOREIGN PATENT DOCUMENTS

| JP | 06-153695 A | 6/1994 |
|----|-------------|--------|
| JP | 07-115844 A | 5/1995 |
| JP | 2000-106752 A | 4/2000 |
| JP | 2002-247917 A | 9/2002 |
| JP | 2005-027585 A | 2/2005 |
| JP | 2007-054044 A | 3/2007 |

OTHER PUBLICATIONS

Kusuda, Mizuho et al. "Characterization of extracellular glucoamylase from the ectomycorrhizal mushroom Lyophyllum shimeji." Published in Mycoscience vol. 45 pp. 383-389. Publcation year: 2004.*

Akira Ohta, "Culture conditions for commercial production of Lyophyllum shimeji", Nikkinpo, vol. 39, pp. 13-20, 1998 (with English abstract).

H. Yoshida et al "A trial cultivaton of Lyophyllum shimeji on solid media", Nikkinpo, vol. 35, pp. 192-195, 1994 with English abstract).

* cited by examiner

*Primary Examiner* — Tien Dinh
*Assistant Examiner* — Michael Kreiner
(74) *Attorney, Agent, or Firm* — Browdy and Neimark, PLLC

(57) ABSTRACT

According to the present invention, there is provided a fungal bed cultivation method of a hon-shimeji mushroom, wherein induction of primordia of a fruit body is conducted by illumination under incubation conditions, and an ongoing culture for fungal bed cultivation of a hon-shimeji mushroom, wherein primordia of a fruit body have been formed thereon during incubation. The culture medium is maintained in a clean state and it is advantageous because the formation of primordia of a fruit body can be carried out in a clean environment and the culture medium wherein primordia of a fruit body have been formed can be transferred to distant mushroom cultivation facilities under clean conditions as such.

5 Claims, No Drawings

METHOD FOR CULTIVATING HON-SHIMEJI MUSHROOM ON FUNGAL BED

TECHNICAL FIELD

The present invention relates to a fungal bed cultivation method and a culture for fungal bed cultivation of a hon-shimeji mushroom (*Lyophyllum shimeji*).

BACKGROUND ART

A hon-shimeji mushroom is a mushroom, which generates on the ground surface in a forest of *quercus* serrata grove or a mixed forest of *quercus* serrata and red pine around in the middle of October. As people say "a hon-shimeji mushroom is excellent in taste, while matsutake mushroom is excellent in flavor", a hon-shimeji mushroom as well as a matsutake mushroom are recognized as the highest grade edible mushrooms. Recently, for edible mushrooms including an enokitake mushroom (*Flammulina velutipes*), a hiratake mushroom (*Pleurotus ostreatus*), a nameko mushroom (*Pholiota nameko*), a bunashimeji mushroom (*Hypsizigus marmoreus, Lyophyllum ulmarium*), a maitake mushroom (*Grifola frondosa*) and the like, a fungal bed cultivation method has been established, wherein a mushroom is artificially cultivated by using a culture medium containing mixed nutrient sources of sawdust, rice bran, wheat bran and the like. Thus, these mushrooms can be harvested stably in any season throughout the year. Although it has also been desired to establish an artificial cultivation method of a hon-shimeji mushroom because of its excellent taste, an artificial fungal bed cultivation thereof has been considered to be difficult because a hon-shimeji mushroom is a mycorrhizal fungus, while the above mentioned enokitake mushroom and the like are wood-rotting fungi.

Ohta of Shiga Prefectural Forest Research Center succeeded in a fungal bed cultivation of a hon-shimeji mushroom for the first time. Patent Document 1 discloses a fungal bed cultivation method of a hon-shimeji mushroom using wheat and the like, and non-Patent Document 1 discloses an experiment for generating a fruit body of a hon-shimeji mushroom using a culture medium containing wheat and the like.

In addition, Patent Document 2 discloses a method for incubating the mycelia of a mycorrhizal fungus using a culture medium in which peat moss is used as a base material and starch and the like are added thereto and, in non-Patent Document 2, the inventers of the above patent document report an experiment for generating a fruit body of a hon-shimeji mushroom using a culture medium in which peat moss are used as a base material starch and the like are added thereto.

However, the method described in Patent Document 1 requires much cost for a culture medium because wheat, and the like used in the culture medium are expensive. Further, the method described in Patent Document 2 do not reach a commercial production level due to a low yield of a fruit body.

Recently, various cultivation methods of a hon-shimeji mushroom have been disclosed for the commercial production of a hon-shimeji mushroom. Patent Document 3 discloses a culture medium for fungal bed cultivation of a hon-shimeji mushroom which comprises Panicoideae plant, and a method for cultivating a hon-shimeji mushroom using the culture medium. Further, Patent Document 4 discloses a fungal bed cultivation method of a hon-shimeji mushroom which comprises preparing a mixed culture medium containing at least corn powder and sawdust of broad leaf trees, inoculating the mycelia of a hon-shimeji mushroom on the mixed culture medium in a moisturized wet state, and incubating the culture medium at a temperature of 30 or lower ° C. to generate a fruit body.

Patent Document 5 discloses a fungal bed cultivation method of a hon-shimeji mushroom which comprises adding crushed oyster shell to a culture medium on which the mycelia of a hon-shimeji mushroom have been inoculated so that a fruit body can generate by incubating, them in a moisturized wet state, and adjusting pH of the culture medium to a range below 7.

Patent Document 6 discloses a fungal bed cultivation method of a hon-shimeji mushroom which comprises using a mixed culture medium prepared by adding small amounts of wheat and/or rice to a culture medium containing corn and sawdust and mixing them, inoculating the mycelia of hon-shimeji mushroom on the culture medium in a moisturized wet state, and incubating it to generate a fruit body.

The Example of Patent Document 1 investigates whether or not a hon-shimeji mushroom strain forms primordia of a fruit body when the mycelia are incubated at 23° C. for 70 days, followed by lowering the temperature to 15° C. And, a formation ratio of a fruit body has been increased by covering the surface of the culture medium with peat. Further, in non-Patent Document 1, the surface of a culture medium is covered with peat with a thickness of 1 cm, when the mycelia of a hon-shimeji mushroom is extended in a incubation step at 22° C. Then, the culture medium is further incubated for additional two weeks and, after completion of cultivation, the culture medium is transferred to a generation chamber at 15° C. to generate a fruit body.

In non-Patent Document 2, formation of primordia of a fruit body is recognized on the 13th-15th day after incubation of a hon-shimeji mushroom strain by inoculating the mycelia of the strain on a culture medium, incubating and maturing it at 23° C., and then carrying out a generation operation in a generation chamber at 16° C.

Patent Document 3 discloses a bottle cultivation method which comprises steps of preparation of a culture medium, filling of a bottle, sterilization of the culture medium, inoculation, incubation (culture), sprouting, growth (cultivation), and harvesting, wherein primordia of a fruit body is formed in the step of sprouting after incubation. Further, in Example thereof, the sprouting is carried out with a cover of Akadama soild.

In Example of Patent Document 4, generation of a fruit body of a hon-shimeji mushroom strain is promoted by incubating the strain at 23° C. for 60 days, incubating the mycelia for additional 7 days with covering the surface of a culture medium with Kanuma soil, transferring the culture medium to a generation chamber at 15° C.

In Example of Patent Document 5, the mycelia of hon-shimeji mushroom strain is incubated at 23° C. for 70 days, the culture medium is transferred to a generation chamber at 15° C., and the cap is removed when a small fruit body is appeared, then the fruit body is harvested when pilei have grown to open.

In Example of Patent Document 6, the mycelia of hon-shimeji mushroom strain is incubated at 23° C. for 55 days, further incubated for additional 10 days with covering the surface of the culture medium with Kanuma soil, and the culture medium is transferred to a generation chamber at 15° C. to promote generation of a fruit body.

Patent Document 1: JP 1995-115844 A
Patent Document 2: JP 1994-153695 A
Patent Document 3: JP 2000-106752 A
Patent Document 4: JP 2002-247917 A
Patent Document 5: JP 2005-27585 A Patent Document 6: JP 2007-54044 A Non-patent Document 1: "Nihon-Kingakkai Kaihou" (Journal of the Mycological Society of Japan), volume 39, pages 13-20, 1998

Non-patent Document 2: "Nihon-Kingakkai Kaihou" (Journal of the Mycological Society of Japan), volume 35, pages 192-195, 1994

DISCLOSURE OF THE INVENTION

Problem to be solved by the Invention

The present inventers have already started a commercial cultivation of a hon-shimeji mushroom, especially commercial cultivation of a big-sized hon-shimeji mushroom based on the technique described in Patent Document 3. However, it has been desired to further develop additional techniques for successful commercial cultivation.

Thus, in view of the above situation, the object of the present invention is to provide a fungal bed cultivation method which allows the stable production of a hon-shimeji mushroom in commercial cultivation.

Means for Solving the Problem

In cultivation of a hon-shimeji mushroom, after incubating the mycelia, the mycelia are usually covered with soil to generate a fruit body. However, induction of a fruit body using covering-soil requires cumbersome because covered soil should be removed from the mycelia in addition to cover the mycelia with soil. At present, generation of primordia of a fruit body is induced in a controlled environment at a lower temperature than a incubation temperature regardless of covering with soil or not. The present inventers have intensively studied the development of fungal bed cultivation of a hon-shimeji mushroom without covering-soil. However, when a production scale exceeds 4 t per lot in terms of an amount of a culture medium to be prepared, instability of a yield of a fruit body has been observed. For solving this instability of yield, the present inventers have further studied each of various factors which affect fungal bed cultivation of a hon-shimeji mushroom to investigate its effect on large-scaled cultivation, intensively. As a result, the present inventors have found that illumination of a culture medium with certain light can allow induction into primordia of a fruit body under incubation conditions for the mycelia, and that termination of induction into the primordia of a fruit body under incubation conditions for the mycelia results in not only stabilization of cultivation of a hon-shimeji mushroom, but also reduction of a total period of cultivation and increase in a yield of a fruit body of a hon-shimeji mushroom. Thus, the present invention has been completed.

That is, in brief, a first invention of the present invention relates to a fungal bed cultivation method of a hon-shimeji mushroom comprising forming primordia of a fruit body during incubation for the mycelia.

The aspects of the first invention include a fungal bed cultivation method of a hon-shimeji mushroom which comprises illuminating a culture medium with light during incubation to form primordia of a fruit body. Preferred aspects thereof include a fungal bed cultivation method of a hon-shimeji mushroom which comprises terminating the formation of primordia of a fruit body during a incubation step. Examples of these aspects include the fungal bed cultivation method of a hon-shimeji mushroom, wherein the light-illumination is carried out at a latter stage of the incubation step. The light-illuminating conditions during incubation of a hon-shimeji mushroom is not specifically limited as long as generation of primordia of a fruit body can be induced, but include 20 or more lux-hour, preferably, 200 or more lux-hour in terms of integrated illumination. Since a hon-shimeji mushroom should be incubated enough so as to avoid formation of voids in the stalk, in the present invention, it is preferred that the mushroom is incubated enough and light-illumination is carried out in a latter stage of the incubation step for 20 to 30 days.

The second invention of the present invention relates to an on-going culture for fungal bed cultivation of a hon-shimeji mushroom, wherein primordia of a fruit body have been formed thereon during incubation. The culture is advantageous because the culture is kept clean and it can be transferred to distant mushroom cultivation facilities as such.

Effect of the Invention

According to the present invention, there is provided an economically advantageous fungal bed cultivation method of a hon-shimeji mushroom, which allows a stable production of a hon-shimeji mushroom in a commercially large scale.

BEST MODE FOR CARRYING OUT THE INVENTION

Hereinafter, the present invention will be explained in detail.

The hon-shimeji mushroom as used herein is referred to a mushroom taxonomically classified into *Lyophyllum shimeji*

The hon-shimeji strain to be used in the present invention is not specifically limited and can be selected any strain as long as it can be artificially cultivated. Examples thereof include known hon-shimeji mushroom strains such as *Lyophyllum shimeji* La 01-27 (FERM BP-10960), *Lyophyllum shimeji* La01-20 (FERM BP-10959), *Lyophyllum shimeji* La 01-37 (FERM P-17456), *Lyophyllum shimeji* La 01-45 (FERM P-17457), and *Lyophyllum shimeji* La 01-46 (FERM P-17458).

Artificial fungal bed cultivation methods such as bottle cultivation, bag cultivation, box cultivation and the like can be applied to the cultivation method of a hon-shimeji mushroom of the present invention, and the method of the present invention is characterized by forming primordia of a fruit body and/or terminating the formation of the primordia during incubation. That is, the present inventors have established for the first time a cultivation method, wherein the growing temperature and the temperature for forming primordia of a fruit body of a hon-shimeji mushroom are unchanged. Herein, the fungal bed cultivation method of a mushroom of the present invention by bottle cultivation is used as an example. This method comprises the steps of preparation of a culture medium, filling a bottle, sterilizing, inoculating, incubating (including formation of primordia), sprouting (including sprouting during incubation), selection of sprouts if necessary, harvesting, and the like. These steps will be specifically illustrated hereinafter, but the present invention is not limited thereto.

The preparation of a culture medium refers to a step comprising measuring the base materials used for fungal bed cultivation, stirring the base materials and adding water to adjust the water content of the culture medium, which is suitable for fungal bed cultivation of a hon-shimeji mushroom. The culture medium to be used for the fungal bed cultivation of a hon-shimeji mushroom to be used in the present invention is not limited as long as the culture medium can be utilized for cultivation. A combination of corn and conifer sawdust, for example sawdust from Japanese cedar (Japanese cedar sawdust) is preferred.

As an example of a ratio of mixture of corn and needle leaved tree sawdust, a ratio of mixture of steam flaked corn and Japanese cedar sawdust is explained below. A ratio of mixture of corn and needle leaved tree sawdust is not limited as long as a hon-shimeji mushroom can be cultivated. From a point of view of obtaining high yield, an amount of steam flaked corn contained in a culture medium for cultivation on fungal bed is at least 40 or more %, preferably 50 or more %, more preferably 60 or more % of the culture medium at the dry weight ratio. Less than 40% is not preferred due to significant decrease in yield of a hon-shimeji mushroom. Because steam flaked corn has low water absorbability, too mush amount of steam flaked corn in a culture medium for cultivation on fungal bed get water which can not be grasped in a culture medium increase and pile in the bottom of a cultivation bottle, which causes non-extend of mycelia. Therefore, an amount of steam flaked corn contained in a culture medium for cultivation on fungal bed is at most 80 or less %, preferably 75 or less %, more preferably 70 or less % of a culture medium in ratio by dry weight.

Moreover, as a example of a water content in a culture medium for cultivation on a fungal bed, a case using a culture medium with steam flaked corn and Japanese cedar sawdust is explained below. A water content in a culture medium for cultivation on a fungal bed is preferably adjusted so that water do not piles in the bottom of a cultivation bottle according to one skilled in the art. For example, a water content is, but is not limited to, 68 or less %, preferably 66 or less % by weight. However, when a water content exceeds 64 or more % by weight, decreased crevice in a culture medium can cause no-extend of mycelia, which result in low yield and low quality of a fruit body. Though the water content is preferably adjusted to 64 or less % by weight, too lower water content can also cause non-extend of mycelia, a deformed fruit body and poor generation due to desiccation and the like of a culture medium. Thus, the water content is preferably adjusted to 50 or more %, more preferably 55 or more % by weight. These water content is suitably established based on the state of the culture medium adjusted with water.

The step of filling of a bottle refers to a step of filling a bottle with a culture medium for cultivation on fungal bed, specifically refers to a step of filling a heat-resistant wide-mouthed cultivation bottle of generally 400-2300 ml in volume with the prepared culture medium for cultivation on fungal bed while applying pressure in an amount of 700-1000 g, preferably 750-850 g when a 1100 ml bottle is used; making one or more holes with a diameter of about 1-3 cm and stoppering the bottle with a cap, more preferably, making a hole with a diameter of 1.5 cm, and 4 holes with a diameter of 1 cm around the former hole. The sterilization of a culture medium refer to a step of killing substantially all bacteria in the culture medium, in the case using vapor, sterilization is carried out generally at 98-100° C. for 4-12 hours when sterilization is carried out under normal pressure, or at 101-125° C., preferably at 118° C. for from 30-90 minutes when sterilization is carried out under high pressure.

The inoculation is a step of inoculating the seed culture on a culture medium which has been allowed to stand to cool after sterilization. Liquid seed culture obtained by culturing mycelia of a hon-shimeji mushroom in a culture medium containing glucose, peptone and yeast extract as main components such as a PGY liquid culture medium or a ½ PGY liquid culture medium at 25° C. for 10-15 days can be used, for example, liquid seed culture is used in the amount of about from 10 to 50 ml per wide-mouthed culture bottle of 1100 ml in volume. Alternatively, known solid seed culture can be used. For example, solid seed culture obtained by culturing the culture medium in which liquid seed culture obtained as above has been inoculated at 25° C. for 60-150 days so as to extend mycelia can be used. For example, the solid seed culture is aseptically inoculated in the amount of about 15 g per wide-mouthed cultivation bottle of 1100 ml in volume.

The incubation refers to a step of growing and maturing mycelia. Mycelia are generally extended throughout a culture medium after inoculation at the temperature of 20°-25° C. and the humidity of 50-80%, and are then matured. The maturation can be omitted. The step of incubation can be suitably established based on the volume of the culture medium. In general, the step of incubation is carried out for 80-120 days, preferably about 100 days when an 1000 ml bottle is used.

According to the present invention, primordia of a fruit body is formed under incubating (culturing) condition with illuminating mycelia for 20-30 days in the later stage of incubation with integral illumination of 20 or more lux-hour, preferably 200 or more lux-hour. Therefore, according to the present invention, formation of primordia of a fruit body can be induced independently of covering mycelia with soil or decrease of the cultivation temperature. Additionally, primordia of a fruit body, formed in this step, can be grown to budlet.

In the present invention, the sprouting is a step of forming sprout (budlet) from primordia of a fruit body and/or enhancing the growth of the budlet. After removing the cap of the bottle in which the primordia and/or budlet have been formed, the sprouting is generally carried out for from 5 to 15 days at from 10° to 20° C., preferably at about 15° C., at the humidity of 80% or more and under the illumination of 1000 lux or less. In addition, several holes can be made on the surface of a fungal bed before the step of incubating or sprouting. Air ventilation is improved by making holes, and cultivating a fruit body from the holes allows a fruit body of a hon-shimeji mushroom with good quality to grow. Because bedewing can occurs due to humidification during sprouting, for the purpose of preventing the surface of a fungal bed from coming wet, the surface can be covered with a foraminate plastic sheet or a corrugated panel, alternatively a cultivation bottle can be reversed and cultured.

The growth is a step of forming a matured fruit body from budlet, and is carried out for 5-15 days under the conditions approximately similar to those in the step of sprouting but illuminating a medium with the illumination of 2,000 or less lux. Because of little effect of wetness from bedewing during the step of growth, a medium is preferably cultured without covering sprouts with a foraminate plastic sheet or a corrugated panel. Additionally, for the purpose of obtaining a single fruit body of commercial value, sprouts on the surface of a fungal bed can be selected to remove the other sprouts but the a few sprouts which is desired to grow to a fruit body, by the initial stage of this step (day 5).

According to the above-mentioned steps, a matured fruit body can be obtained and the fruit body is then harvested. Thus, all steps of cultivation are brought to completion. Though a method of bottle cultivation according to the present invention is explained herein, the present invention can be applied to all method for cultivating mushroom, but not limited to the above mentioned method for bottle cultivation.

The present invention can cut down the period for sprouting, which is started by removing the cap of a bottle and previously took 10-20 days, to 5-15 days. Thus, the total period to cultivate a hon-shimeji mushroom on a fungal bed is cut down. In addition, the formation of primordia of a fruit body is induced under the clean environment without removing the cap of a bottle. It is the extremely noted effect of the present invention to cut down total period for cultivation, and to cause significantly increased yield of mushroom.

The present invention will now be described in more detail with reference to the following examples, but the present invention is not limited to only the scope of the examples.

EXAMPLE 1

Mycelia of *Lyophyllum shimeji* La 01-27 strain (FERM BP-10960) were inoculated to 100 ml of a PGY liquid culture medium (composition: glucose 2.0% (w/v), peptone 0.2% (w/v), yeast extract 0.2% (w/v), $KH_2PO_4$ 0.05% (w/v) and $MgSO_4 \cdot 7H_2O$ 0.05% (w/v)), and the mycelia were cultured at 25° C. for 7 days with shaking (100 rpm). After 2 ml of the above mentioned culture was inoculated to the PGY liquid culture medium, the mycelia was cultured for 7 days with shaking (100 rpm). Then, the full culture was inoculated to a jar fermenter of 200 L in volume (manufactured by Komatsugawa Seisakusyo) with 160 L of the PGY liquid culture medium, and the culture was cultured for 6 days with stirring (stirring ratio: 100 rpm, ventilation volume 25 L/minute) to prepare liquid seed culture. On the other hand, flaked corn (manufactured by Iisaka Seibaku) and Japanese cedar sawdust as needle-leaved tree sawdust (manufactured by Tomoe Bussan Co., Ltd.) were mixed at the dry weight ratio of 2:1 (flaked corn: needle-leaved tree sawdust), and water was added thereto so that the final water content in the culture medium became 62% by weight. The mixture was thoroughly mixed with stirring, and a wide-mouthed culture bottle (1100 ml) made of polypropylene (about 5,000 bottles per lot) was filled with the resulting culture medium with applying pressure so that the total weight of the bottle with a cap become 800 g. On the center portion of the surface of the filled culture medium, a hole with a diameter of 2.0 cm and a depth of about 10 cm was made, and in circle of 4 cm across on the surface of the filled culture medium, 4 holes with an diameter of 1 cm and a depth of 10 cm were evenly made. Then, the cultivation bottle was stoppered with a cap, and the culture medium was autoclaved at 118° C. for 30 minutes and allowed to stand to cool to 20° C. to prepare a culture medium for cultivation on a fungal bed (a solid culture medium). About 25 ml of the above-mentioned liquid seed culture was inoculated to the solid culture medium, and the mycelia were incubated in a dark place at the temperature of 20° C. and at the humidity of from 70 to 75% for about 75-85 days to extend the mycelia throughout the culture medium. The culture medium is incubated for additional 25-35 days under the same condition mentioned above except for illuminating culture medium for 8 hours per day (total period for incubation was about 110 days) to form primordia of a fruit body. Illumination to the culture medium was measured by illumination counter (manufactured by Konica-Minoruta, T-10M) to be in the range between 0.1-600 lux so that each culture medium was illuminated with 20-120,000 lux-hour in integral illumination. Under any condition of illumination, primordia of a fruit body is well induced. The cap was then removed and the bottle was reversed. Thereafter, the bottle was transferred to a sprountion chamber where the temperature was controlled to 15° C. and the humidity was controlled to 115-120% in the indication value on HUMID EYE 100 (manufactured by Saginomiya Seisakusho, Inc.), and sprouting was carried out for 7 days under the illumination of 100 or less lux. The bottle was then reversed to normal direction, and unnecessary sprouts other than 4-5 sprouts having good shapes which will be grown to fruit body were removed using a spatula, from the multiple sprouts generated on the surface of a medium. Additionally, the bottle was placed for 10-11 days in a growth chamber where the temperature was controlled to 15° C. and the humidity was controlled to from 105% to 120% by the indication value on HUMID EYE 100 (manufactured by Saginomiya Seisakusho, Inc.), and sprout were grown for 9-11 days under the illumination of 50-100 or less lux so that a matured fruit body was obtained and harvested. Total period for cultivation was 126-128 days. The result obtained from 10 lot cultivation according to the above mentioned method are shown below.

TABLE 1

| Lot No. | average yield per cultivation bottle (g) |
|---|---|
| 070522 | 32.0 |
| 070523 | 46.3 |
| 070524 | 40.8 |
| 070525 | 42.3 |
| 070529 | 43.8 |
| 070530 | 46.4 |
| 070531 | 41.2 |
| 070601 | 44.0 |
| 070607 | 41.0 |
| 070608 | 39.1 |
| mean value | 41.7 |
| standard deviation | 4.16 |

As shown in table 1, the average yield per cultivation bottle is significantly increased in a test with significance level of 5% (P=0.006) as compared with Comparative Example 1.

COMPARATIVE EXAMPLE 1

According to the same manner as that in Example 1, the cultivation was carried out except that the incubation was carried out without illumination throughout all the incubation period. No fruit body was formed during the incubation step. The sprouting was carried out for 10 days so that primordia of a fruit body was formed during the subsequent step. The total cultivation period was 129 to 131 days. The results obtained from cultivation of 10 lots in the above method are shown below.

TABLE 2

Table 2

| Lot No. | Average yield per cultivation bottle (g) |
|---|---|
| 070312 | 21.5 |
| 070313 | 34.1 |
| 070314 | 36.5 |
| 070315 | 39.7 |
| 070316 | 33.4 |
| 070319 | 36.1 |
| 070320 | 35.3 |
| 070321 | 43.8 |
| 070322 | 30.8 |
| 070323 | 35.4 |
| mean value | 34.7 |
| standard deviation | 5.82 |

As shown in Table 2, the average yield per incubation bottle was significantly decreased as compared with Example 1.

INDUSTRIAL APPLICABILITY

According to the present invention, there is provided a fungal bed cultivation method which allows a stable production of a hon-shimeji mushroom, and an ongoing culture medium for fungal bed cultivation of a hon-shimeji mushroom, wherein primordia of a fruit body have been formed during incubation. The culture medium is maintained in a clean state and it is advantageous because the formation of primordia of a fruit body can be carried out in a clean environment and the culture medium wherein primordia of a fruit body have been formed can be transferred to distant mushroom cultivation facilities under clean conditions as such. According to the present invention, a total period for cultivation can be reduced, and it is possible to carry out stable and efficient commercial production of a hon-shimeji mushroom in large scale.

The invention claimed is:

1. An artificial fungal bed cultivation method of a hon-shimeji mushroom, comprising:
   inoculating a culture medium with a hon-shimeji seed culture; and
   incubating the inoculated culture medium for a period of 80-120 days to grow mycelia and form primordia of a fruit body of the hon-shimeji mushroom,
   wherein the incubating step comprises illuminating the culture medium with light for the last 20-30 days of the 80-120 day incubation period after earlier incubation in the dark.

2. The method of claim 1, wherein the culture medium is illuminated with integral illumination of 20 or more lux-hours.

3. The method of claim 1, wherein the culture medium is illuminated with integral illumination of 200 or more lux-hours.

4. The method claim 1, wherein the fungal bed cultivation method is by bottle cultivation.

5. The method of claim 4, wherein the incubation period is about 100 days.

* * * * *